US007472474B2

(12) United States Patent
Jaen

(10) Patent No.: US 7,472,474 B2
(45) Date of Patent: Jan. 6, 2009

(54) PALLET ASSEMBLING MACHINE

(75) Inventor: José Boix Jaen, Poligono Industrial la Granadina, Manzana 1-calle 5, Albatera (ES) E 03340

(73) Assignee: Jose Boix Jaen, Albatera (ES)

(*) Notice: Subject to any disclaimer, the term of this patent is extended or adjusted under 35 U.S.C. 154(b) by 0 days.

(21) Appl. No.: 11/453,269

(22) Filed: Jun. 14, 2006

(65) Prior Publication Data

US 2007/0006450 A1 Jan. 11, 2007

Related U.S. Application Data

(63) Continuation of application No. PCT/ES2004/000544, filed on Dec. 3, 2004.

(30) Foreign Application Priority Data

Dec. 16, 2003 (ES) ................................ 200302959

(51) Int. Cl.
*B23P 21/00* (2006.01)

(52) U.S. Cl. ............................. 29/772; 29/771; 29/783; 493/84; 493/334; 493/964

(58) Field of Classification Search ................... 29/772, 29/564.1, 430, 771, 783, 787; 493/84, 334, 493/964

See application file for complete search history.

(56) References Cited

U.S. PATENT DOCUMENTS 2,473,656 A * 6/1949 Lyon et al. .................. 425/303
2,856,826 A * 10/1958 Norquist et al. ............. 493/417
3,633,903 A * 1/1972 Foster, Jr. .................... 271/197
4,002,008 A * 1/1977 Grasson ....................... 53/167
4,039,112 A * 8/1977 Schultz ........................ 227/40
4,403,388 A * 9/1983 Belcher ....................... 29/429
4,518,379 A * 5/1985 Eldridge ...................... 493/334
4,792,325 A * 12/1988 Schmidtke .................. 493/334
5,184,558 A * 2/1993 Wozniacki ................. 108/51.3
5,372,570 A * 12/1994 Schmidtke et al. .......... 493/399
5,379,513 A * 1/1995 Thompson et al. ............ 29/772
5,385,625 A * 1/1995 LaFreniere ............... 156/379.8
5,569,148 A * 10/1996 LaFreniere et al. .......... 493/462
5,797,832 A * 8/1998 Ong et al. ................... 493/462
6,159,137 A * 12/2000 Lee et al. .................... 493/355
6,736,591 B2 * 5/2004 Buck ........................ 414/797.9

(Continued)

FOREIGN PATENT DOCUMENTS

ES 2027487 6/1992

(Continued)

*Primary Examiner*—Essama Omgba
(74) *Attorney, Agent, or Firm*—Klauber & Jackson, LLC

(57) ABSTRACT

The machine is designed to form pallets by assembling cardboard longitudinal beams (1) and transverse beams (2) comprising means for storage, feed and dosing of longitudinal beams (1) and with means for storage, feed and dosing of transverse beams (2), means provided at corresponding areas (4, 5) for placing the longitudinal beams (1) longitudinally edgewise and coupling transversally thereto the corresponding transverse beams (2), both being provided with complementary notches for assembling the same. The longitudinal beams (1) from the area (4) are displaced on rails (16) and are situated in the area (5) where the transverse beams (2) fall and are pushed vertically by a pusher (22) to assemble the transverse beams (2) onto the longitudinal beams (1) previously and appropriately placed in the area.

12 Claims, 6 Drawing Sheets

U.S. PATENT DOCUMENTS 6,758,800 B2 * 7/2004 Boix Jaen .................. 493/167
6,763,567 B2 * 7/2004 Smith et al. .................. 29/430
6,944,928 B1 * 9/2005 Johansson .................... 29/430
7,175,738 B2 * 2/2007 Lindsay et al. ........... 156/442.1
2002/0104210 A1 * 8/2002 Buck ........................... 29/430
2008/0188364 A1 * 8/2008 Graham et al. ................ 493/84

FOREIGN PATENT DOCUMENTS

WO WO82/03995 11/1982
WO WO 2005058566 A1 * 6/2005

* cited by examiner

PALLET ASSEMBLING MACHINE

RELATED APPLICATIONS

The present application is a Continuation of co-pending PCT Application No. PCT/ES2004/000544, filed Dec. 3, 2004 which in turn, claims priority from Spanish Application Serial No. P200302959, filed on Dec. 16, 2003. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

This invention, as expressed in the title of this specification, relates to a pallet assembling machine, the pallets in this case being made completely out of cardboard and made up by transverse beams and longitudinal beams provided with complementing notches that enable the assembly based on the different means and devices the machine is equipped with, essentially, the means of loading and positioning the longitudinal beams and the means of loading and positioning the transverse beams, as well as the pusher elements that enable the transversal assembly of both elements.

The objective of the invention is to provide a machine capable of assembling transverse and longitudinal elements to form the structure of a pallet in a simple, efficient and highly productive manner.

BACKGROUND OF THE INVENTION

Currently, there are machines to assemble the traditional wooden pallets made by transverse beams and battens that are nailed to each other. The Spanish patent P-9001274 relates to an automatic one way advance pallet nailing machine that includes the means to feed the wooden transverse beams and the wooden lath or batten strips to be nailed over the transverse elements, and also includes nail guns to effect the nailing action. This machine is also equipped with the means to switch the position or turn about the formed structures before feeding a new series of wooden strips over the opposite face of the structure and nail them to form a pallet.

This machine, besides being complex, since it requires the means to feed, nail, position, turning the structure around, etc, has the added inconvenient that has been designed for the assembly of wooden pallets, and therefore its structure cannot be used to assemble pallets made of cardboard longitudinal and transversal elements.

DESCRIPTION OF THE INVENTION

The machine described in this invention is designed, precisely, to assemble pallets made of cardboard and allows the assembly of the longitudinal and transversal elements that make up the pallet's structure without the need of additional affixing elements to put them together.

More specifically, the machine object of the invention is designed to assemble transversal and longitudinal elements of various types so differently structured pallets can be formed, and has the particularity of including two well differentiated areas, one area is designed for the storage, feeding and dosage of longitudinal beams or elements, and the other area is designed for the storage, feeding and dosage of transversal beams or elements, both the transversal and longitudinal elements being supplied by the machine one by one to meet at the common point where they are assembled together.

To allow the assembly of longitudinal and transversal elements it is necessary that both have notches in their lower edge and those said notches complement and match those notches located in the upper edge of the longitudinal elements, since the assembly process is done with the transversal elements travelling in a vertical position and a downward direction over to the longitudinal elements. During the travelling path of the longitudinal elements glue is injected on the notches to aid the affixing process.

The machine includes several feeding and dosage deposit areas for longitudinal elements arranged in a collateral and parallel manner amongst them, as well as several feeding and dosage deposits of transversal elements arranged so that they corresponds with the former, and are provided with a transportation rail guide that moves the longitudinal elements towards the area where the transverse elements will be fed.

Specifically, each feeding and dosage deposit area for the longitudinal beams comprises a plate with a tilted portion that configures a lateral support for the longitudinal beams that are piled by leaning one of the longitudinal edges of said beams over said support surface of the plate, while the longitudinal beams are retained by means that are actuated by a cylinder that actuates, in turn, over the claws that retain the pile when the previous means move in a basculating motion to expel the lower longitudinal beam towards a channel or passageway placed below, all of it associated to a system of spring mediated rockers.

Said plate that supports the longitudinal beams, incorporates in its outer or posterior face, the dosage mechanism that is part of the retention means mentioned above.

A basculating bumper has been placed at the exit end of the longitudinal beam feeding and dosage system mentioned above to establish a mean to position the longitudinal elements on edgewise on their side, that is, laying on one of its longitudinal edges in a horizontal position, so they can be pointed, one by one, towards the channel or passageway provided with a rail guide that is placed in the lower side that transports the longitudinal elements towards the area in which they will be deposited and the transversal elements will be then affixed to them during the assembly stage. A particularity of the system is that the channel or passageway has been outfitted with lateral retractile guides that are, preferably, located at the areas where the transversal elements are assembled, allowing the downwards sliding of said transversal elements on their way to be assembled onto the longitudinal elements.

All the feeding and dosage means for both the longitudinal and transversal elements are equipped with spindle screws, sliding devices and other appropriate accessories to aid and control the relative positioning of said feeding and dosage means.

As for the feeding and dosage deposit for the transversal elements, it is configured by a couple of "U" shaped pillars facing each other and separated by a distance that will correspond, logically, with the length of the transversal elements, establishing a vertical storage guide for said transversal elements, the lower transversal element is then retained by actuating basculating bumpers that allow said lower transversal element to fall towards a channel established to that effect and equipped with a wall presenting a tilted surface that acts as a deflector allowing the transversal element to be positioned vertically and parallel to the vertical line of the pile of elements, at the exit end of this deflecting system there is a channel that the transversal element accesses in said position, and is then pushed by a pusher device to travel downwards and positioned with its notches facing the notches of the longitudinal elements and arrive to the area where the transversal element will be assembled over the longitudinal element that has been previously placed in the appropriate position for this to occur.

The machine allows the assembly of differently structured cardboard pallet models, that is, is capable of assembling different types of pallets. This can be achieved by merely regulating the position of the storage, feeding and dosage means for both the longitudinal and the transversal elements.

BRIEF DESCRIPTION OF THE DRAWINGS

To complement the detailed description to be found below and to aid in the understanding of the characteristics of the invention, a set of drawings has been attached to this specification. Said set of drawings will facilitate the understanding of the innovations and advantages of this pallet assembling machine that is the object of the invention.

DESCRIPTION OF THE PREFERRED EMBODIMENT

Figure 1:
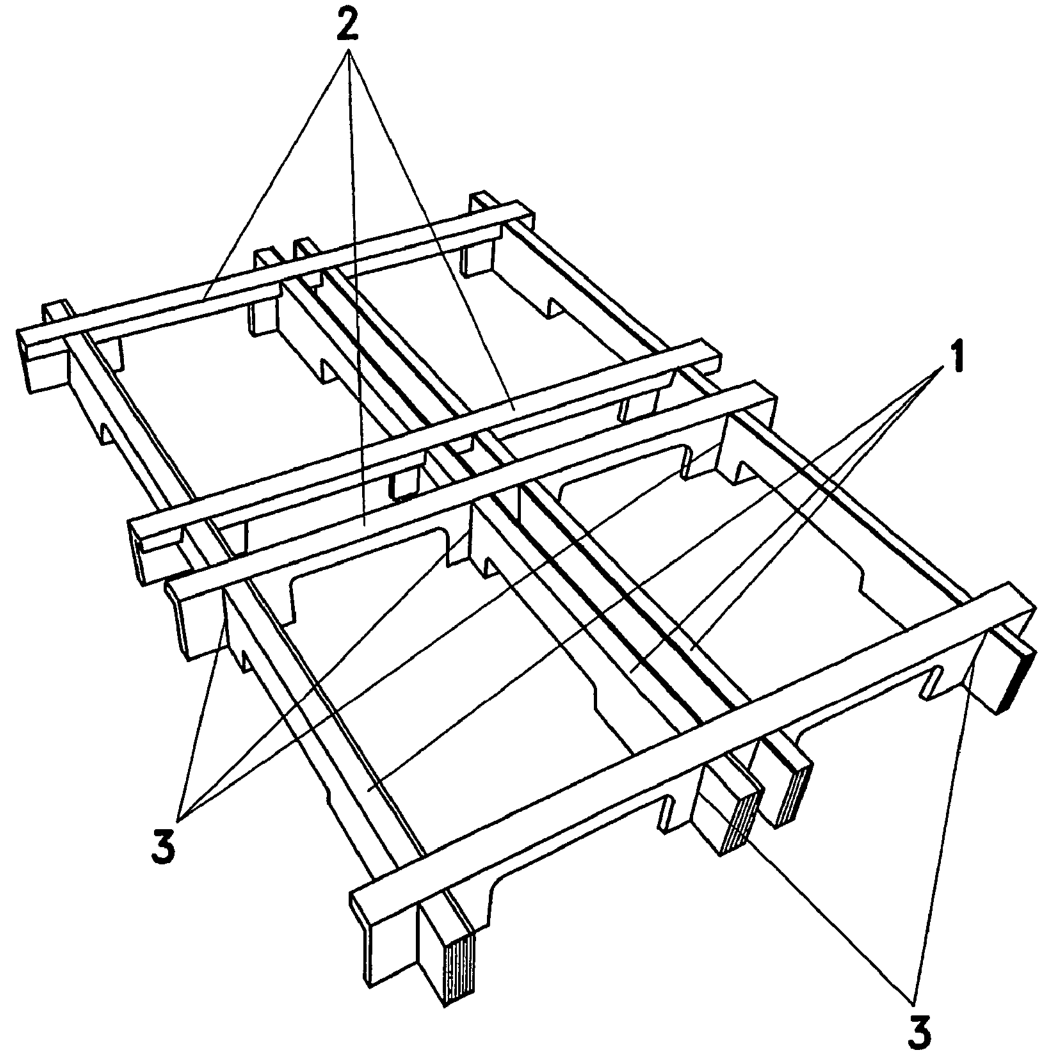
FIG. 1 Shows a perspective view of the structure of a given type of pallet that has been assembled by the machine object of the invention.

As shown in FIG. 1, the structure of each pallet is composed of various longitudinal beams 1 and transversal beams 2 both provided with matching notches 3 that enable the assembly of both beams.

Figure 2:
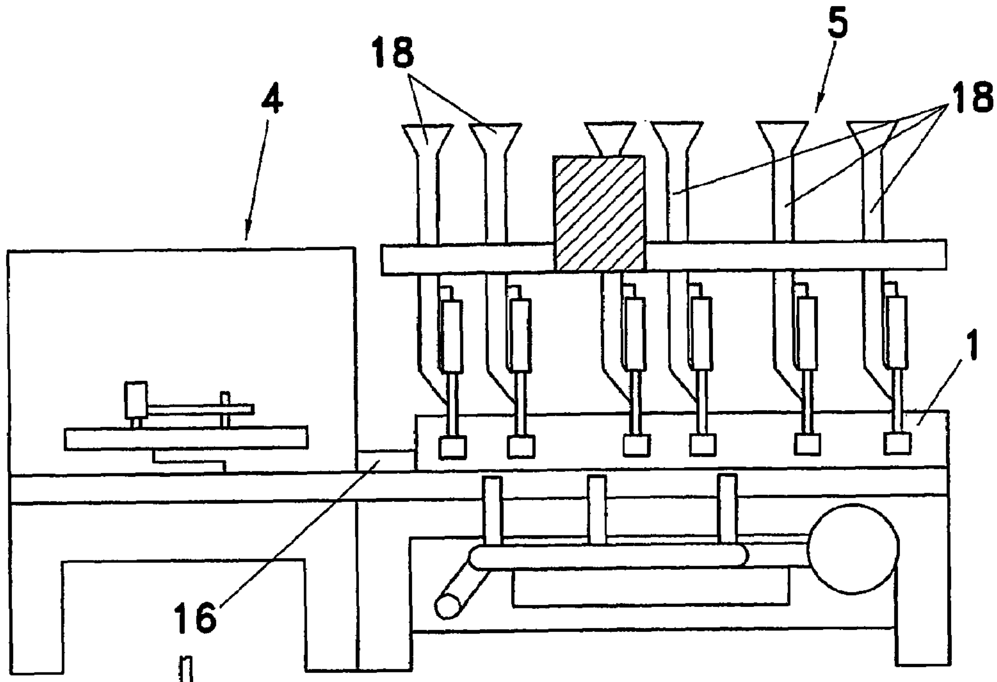
FIG. 2 Shows an outline view of the section of the machine that configures the two areas of feeding and dosage for both the longitudinal and the transversal elements.

The assembly of the longitudinal beams 1 and transversal beams 2 to make a pallet such as the one shown in FIG. 1, is done by the machine described in this invention, that has two well differentiated areas 4 and 5, as shown in FIG. 2, the first of these areas is set as the feeding and dosage area for longitudinal beams 1, and the second area 5 serves as the feeding and dosage area for the transversal beams 2, as well as serving as the assembly area where they are affixed to the longitudinal beams 1.

Figure 4:
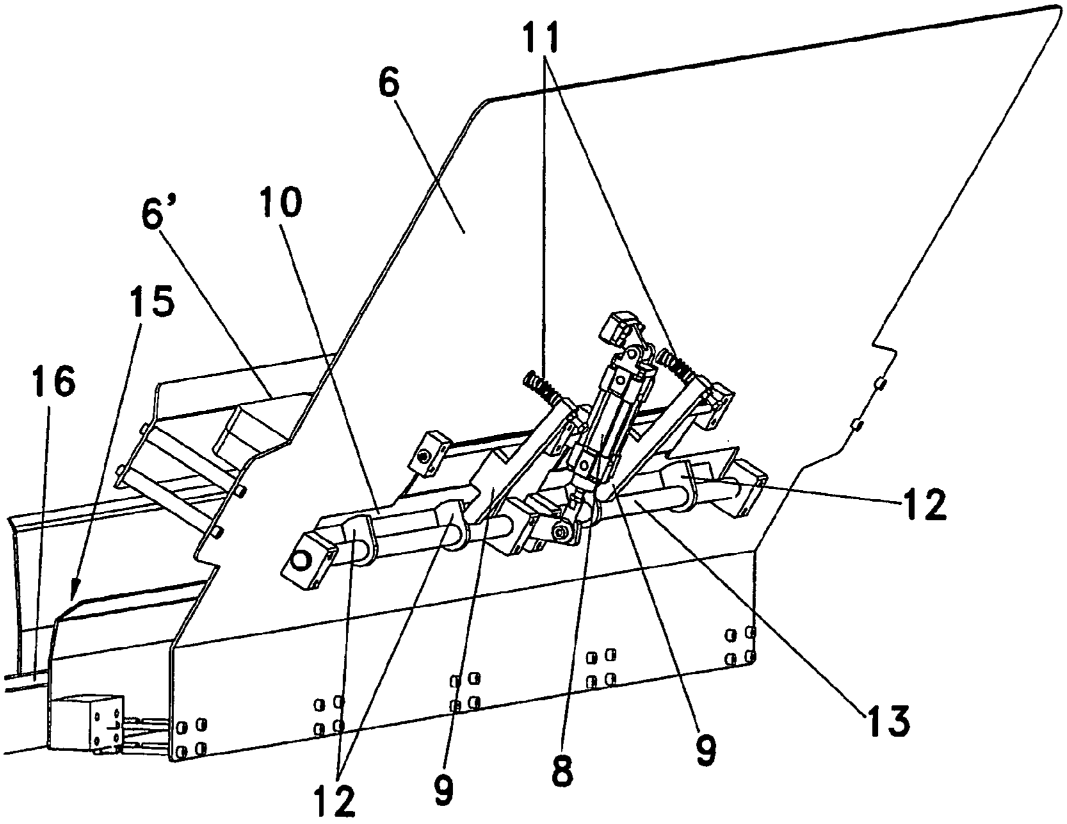
FIG. 4 Shows a perspective view of the storage, feeding and dosage means for the longitudinal elements.
Figure 5:
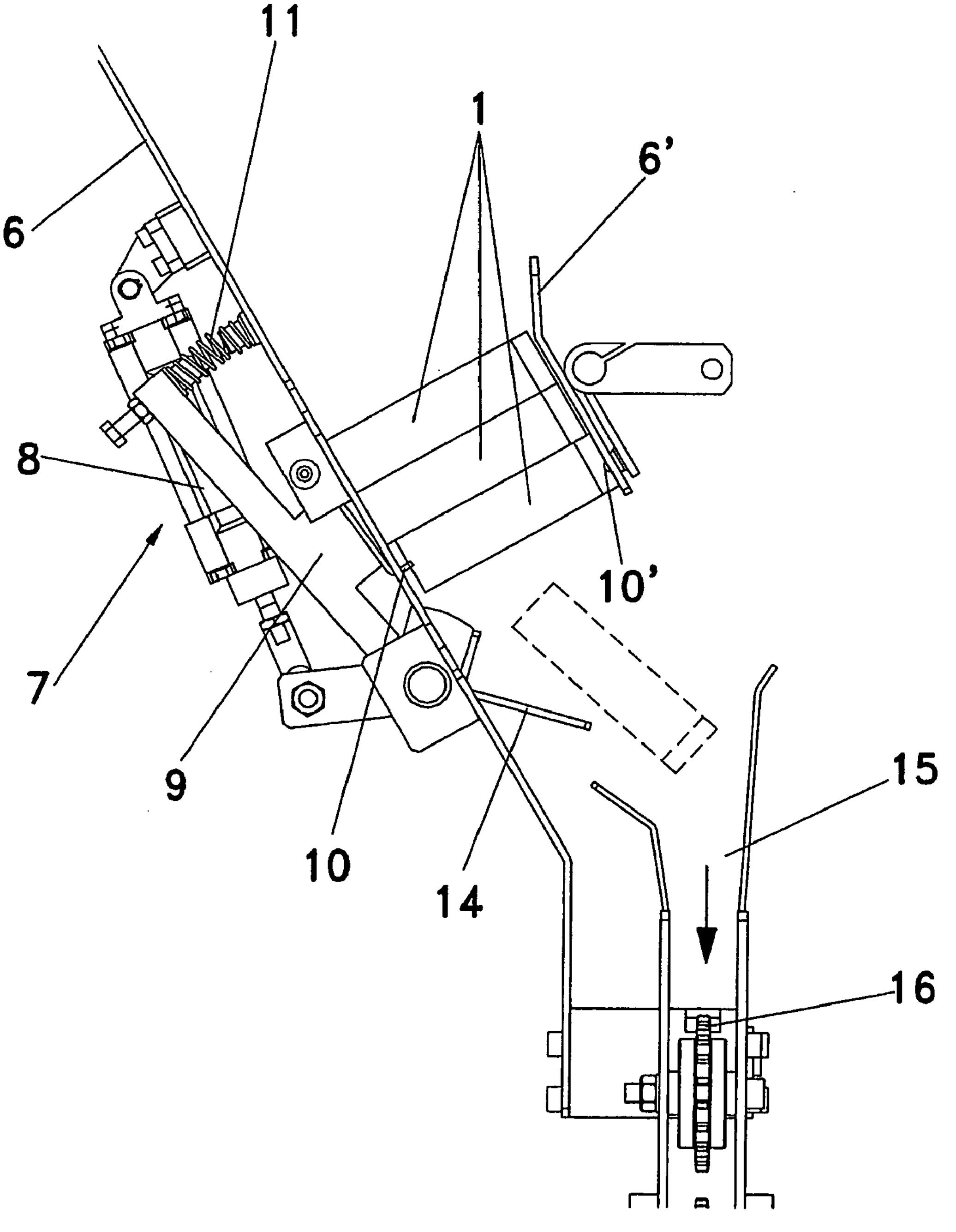
FIG. 5 Shows a lateral profile view of the set represented in the previous figure, in which the storage, feeding and dosage means for the longitudinal elements can be seen.

The storage, feeding and dosage of the longitudinal beams 1 as shown in FIGS. 4 and 5, encompass a plate 6, which has considerable length, and positioned in a tilted position, that supports the longitudinal beams 1 that are positioned laying on one of their longitudinal edges, said plate 6 is complemented by an additional plate 6' which is separated from plate 6 by a distance that is approximately that of the width of the longitudinal beams 1 as shown in FIG. 5.

The posterior or external face of said support plate 6 for the longitudinal beams 1, is equipped with the corresponding dosage mechanism 7 with a cylinder 8, and a rocker 9, to which retention means or claws 10 and 10' are associated, and said rocker is actuated by a spring 11 that tends to thrust the rocker 9 in the direction of the retention means or claws 10 and 10' for them to support the pile of longitudinal beams 1.

In addition there are bumpers 12 mounted over a basculating axis 13, one of the bumpers 12 ceases acting over the rocker 9 and causing, by the action of the corresponding springs 11, the retention means or claws 10 and 10' to be thrown against the longitudinal beams 1 and therefore blocking said elements in their piled position as shown in FIG. 5.

Below said dosage systems there is a basculating bumper 14 that allows the fall of the longitudinal beam 1 placed in the lower position towards a first channel or passageway 15. The bumper 14 is placed in such a manner that longitudinal beam 1 accesses first channel 15 laying on one of its edges, that is, with its lower longitudinal edge placed horizontally in order to reach rail guide 16 located in the lower part of the first channel 15, that will transport the longitudinal beams 1 from area 4 to area 5, there are also pusher elements 17 that position, in a precise manner, the longitudinal beams 1 in area 5, the same area to which the transversal beams 2 travel in vertical position with their notches 3 facing the matching notches of the longitudinal beams to allow assembly of both beams and form the required pallet.

According to the above, the pile of pallets is retained by the basculating bumper 14, that when is actuated by the cylinder 8, causes with the oscillating motion of the basculating bumper 14 the longitudinal beam 1 placed on the lower position of the pile to fall, while the next longitudinal beam 1 in the pile is retained, and therefore the pile itself is also contained, by claws 10 and 10' that act in synchronicity with bumper 14 while said bumper is basculating, since when said bumpers recovers its stationary position claws 10 and 10' retract and the pile of longitudinal beams 1 is again supported by said basculating bumper.

Figure 3:
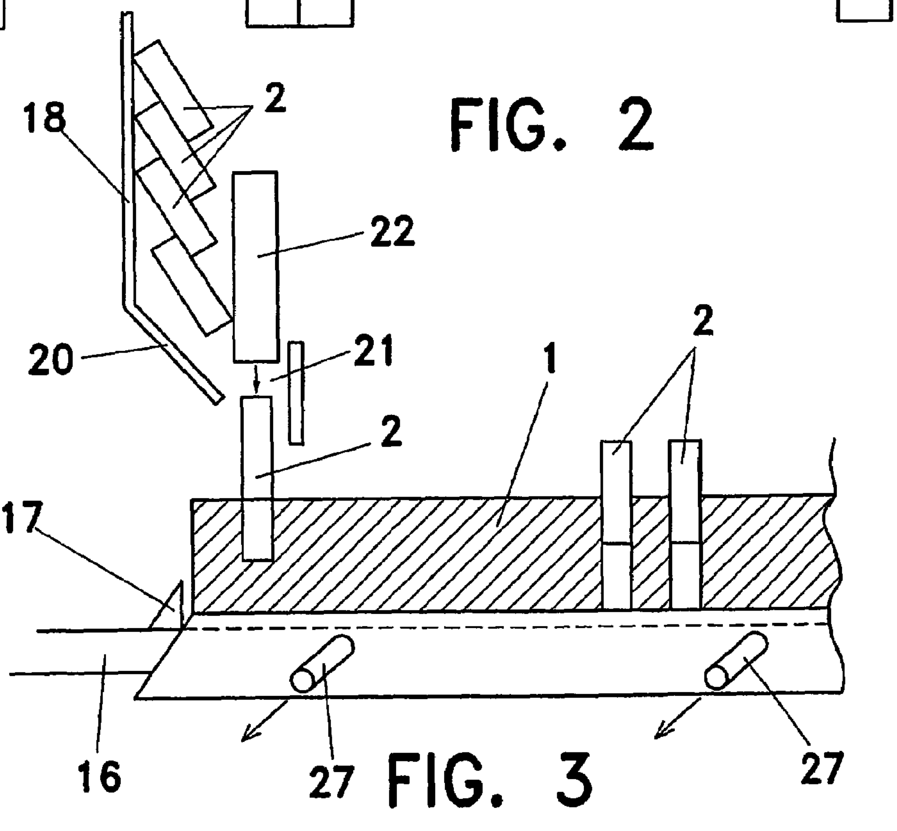
FIG. 3 Shows another outline view of a profile of the transversal element dosage device and their subsequent assembly onto the longitudinal elements.
Figure 6:
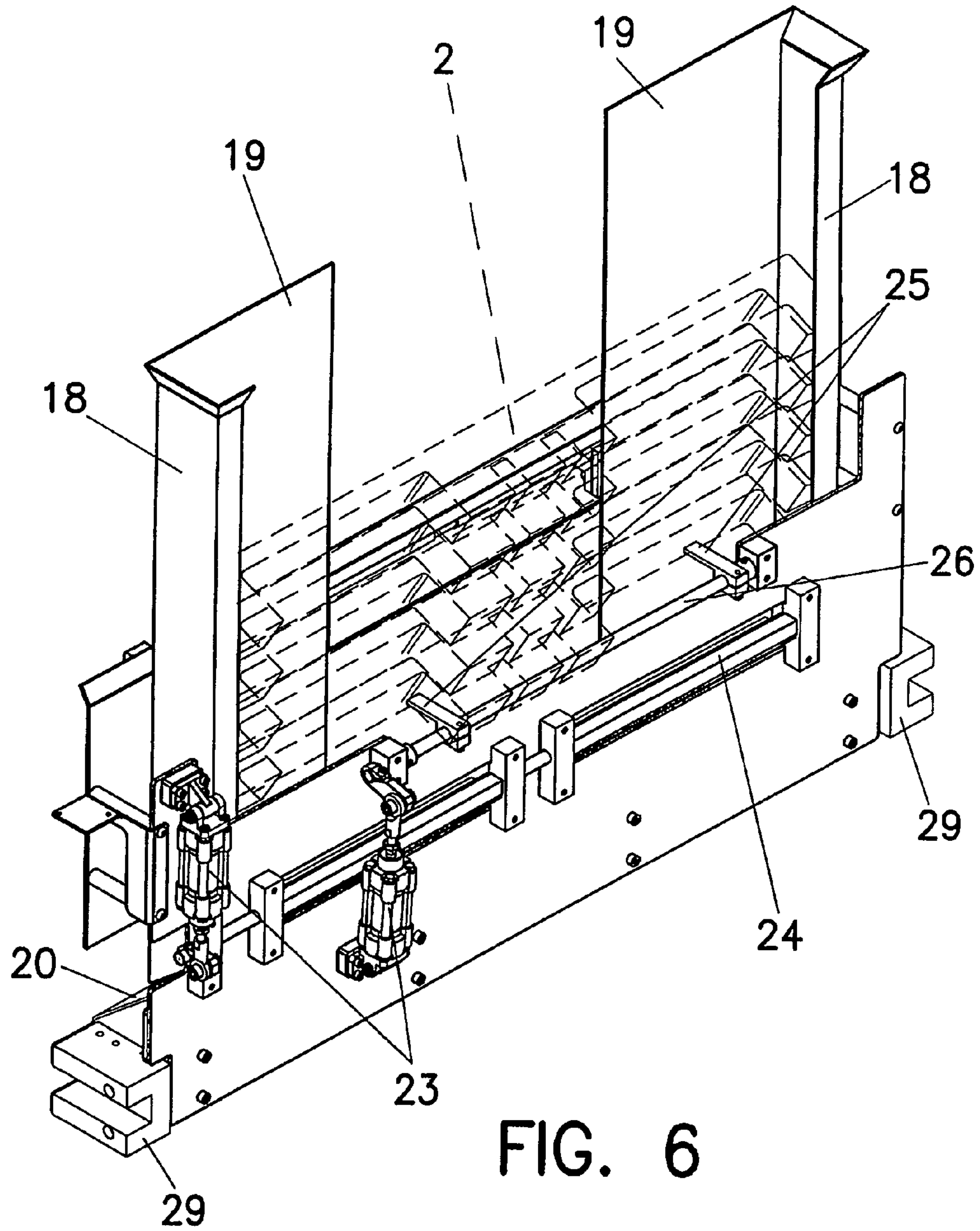
FIG. 6 Shows a perspective view of the storage, feeding and dosage means for the transversal elements.

The storage, feeding and dosage of the transversal beams 2, as shown in FIG. 6, requires a pair of vertical pillars 18 placed apart at a distance that will correspond, logically, to the length of the transversal beam or beams 2 in question, said pillars or profiles being configured in a "U" shape to frame a guide against which the transversal beams 2 are piled by leaning on the largest wing 19 of said profiles 18, as seen in FIG. 3, in such a manner that the piled transversal beams 2 can access a tilted and deflecting surface 20 that guides the transversal beams 2 towards attaining a vertical position on their way to access second channel 21, above which there is a pusher element 22 that pushes each transversal beam 2 on a downward descent and presses it against the appropriate longitudinal beam 1 and thus achieving the assembly between both beams since their respective matching notches 3 will be facing each other. Once the assembly of the various transversal beams 2 over the longitudinal beams 1, previously placed below, has been completed the extraction operation of the pallet thus obtained begins by means of the elements and means designed to that effect.

FIG. 6 shows the actuating cylinders 23 and the bumper 24 which function is to retain the fall of the transversal beam, since the pile, or rather the lower transversal beam is retained by retractile bumpers 25 located over the basculating axis 26, as represented in FIG. 6, all of it in such a manner that the basculating motion of said bumpers 25 allows the fall of the first transversal beam 2 in order for it to be fed towards second channel 21 according to the process described above.

Figure 7:
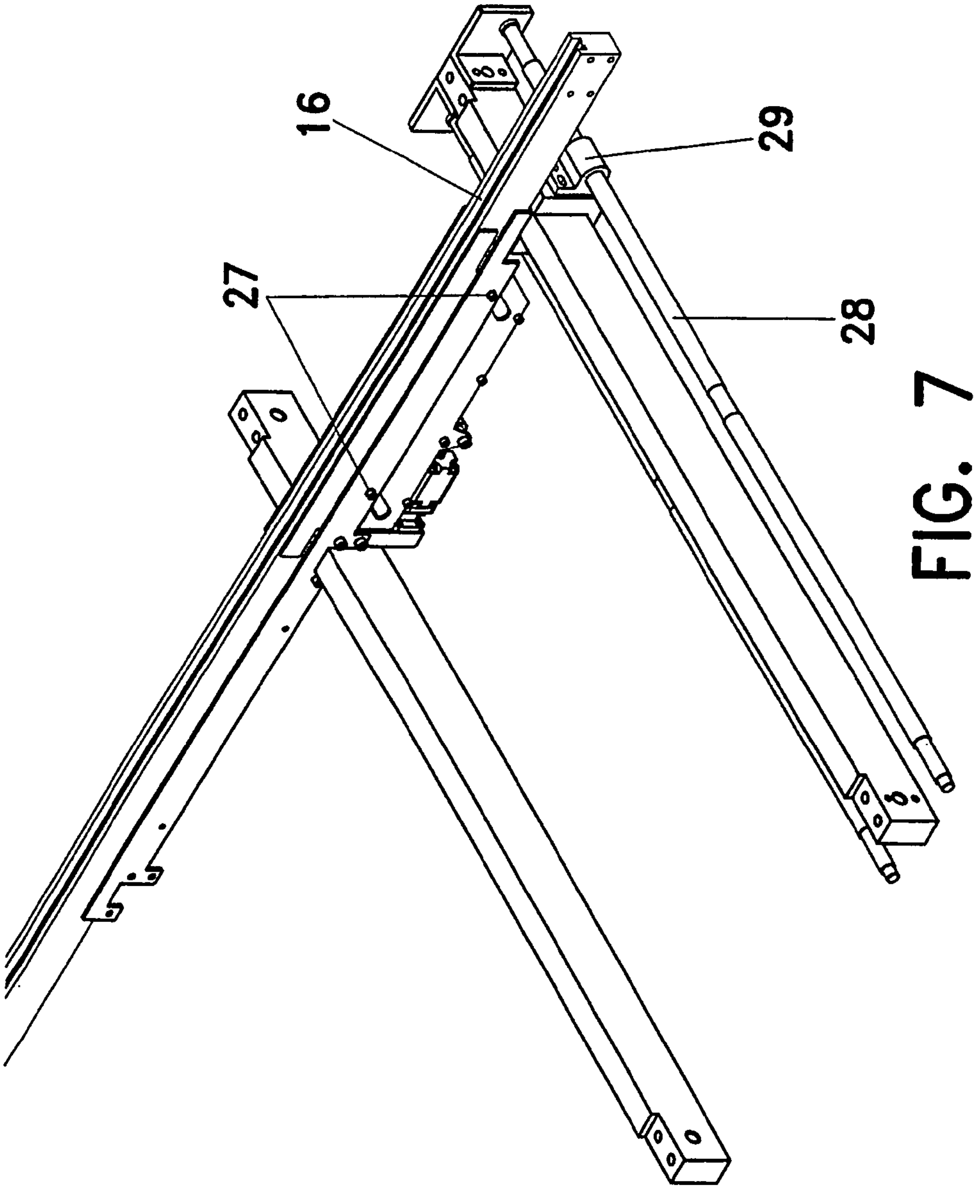
FIG. 7 Shows a perspective view of the rail guide for the longitudinal elements, as well as the regulation means that allow changing the position of the feeding and dosage means for the longitudinal elements.

FIG. 7 shows rail 16 to guide the longitudinal beams 1, this rail guide 16 has retractile bumpers 27 placed on its sides, that is, the bumpers 27 can be stowed away or retracted during the pressing operation but not during the transportation operation, since there are is a profile in the machine that travels vertically in each one of the transversal beams feeding-dosificator means.

Said retractile bumpers 27 will be placed above area 5, coinciding with the assembly area for the transversal beams 2 and allowing assembly of said elements all the way to the bottom of the structure by having previously lowered them to that point, and having the particular characteristic that said lateral bumpers 27 have to be retracted to allow the passage of the transversal beams 2 without harming them or impeding their free passage.

Finally, the machine has devices to regulate the relative position of each feeder-dosificator by means of spindle screws 28, sliding guides 29 and additional accessories that allow for said adaptability.

The invention claimed is:

1. A PALLET ASSEMBLING MACHINE, designed to assemble different types of cardboard longitudinal and transversal beams to form different pallet structures, and that said longitudinal and transversal beams are equipped with matching notches to enable the assembling process, wherein it comprises two well differentiated areas, the first designed for storage, feeding and dosage of the longitudinal beams, and the second designed for storage, feeding and dosage of the transversal beams, the first area comprises a plurality of feeding and dosage deposit spaces, rail guides to transport the longitudinal beams, and a pusher element to aid in the transportation, gluing and positioning of the longitudinal beams over to the second area; in said second area there are a plurality of feeding and dosage deposits for the transversal beams, and vertical pusher elements to assemble the transversal beams fed and dosed in a vertical position over the longitudinal beams in such a manner that the notches on both the longitudinal and the transversal beams are faced to match for the assembly.

2. THE PALLET ASSEMBLING MACHINE, according to claim 1, wherein the plurality of feeding and dosage deposit spaces for longitudinal beams are arranged collaterally and parallel to each other, having the corresponding transportation rail guide placed under each of them, and the plurality of feeding and dosage deposits for the transversal beams are arranged in a corresponding manner with the former.

3. THE PALLET ASSEMBLING MACHINE, according to claim 2, wherein each feeding and dosage deposit space for longitudinal beams is conformed by a tilted plate equipped with retention means to contain a pile of longitudinal beams, said beams lean on a tilted position on one of their longitudinal edges over the support provided by the inner surface of the tilted plate, said tilted plate has a length long enough to support the longitudinal beams and has in its external or posterior face a dosifying mechanism to feed the longitudinal beams.

4. THE PALLET ASSEMBLING MACHINE, according to claim 3, wherein the dosifying mechanism comprises an actuating cylinder, and rockers that are engaged by springs to be placed on the pushing position on bumpers that are the means to contain a pile of longitudinal beams, and said bumpers are mounted over a basculating axis that allow said bumpers to move with a rocking motion and to be released to feed the lower longitudinal beam; additionally there is provided a basculating bumper located below the longitudinal beams stockpile which bumper orients and projects each longitudinal beam towards a first channel so these beams can be placed on their side over the transportation rail guide located in the lower part of said first channel, and additionally having claws to contain the pile while the bumper is basculating.

5. THE PALLET ASSEMBLING MACHINE, according to claim 4, wherein the feeding and dosage means for longitudinal and transversal beams are equipped with corresponding spindle screws and sliding guides that regulate the relative position of said means.

6. THE PALLET ASSEMBLING MACHINE, according to claim 3, wherein the feeding and dosage means for longitudinal and transversal beams are equipped with corresponding spindle screws and sliding guides that regulate the relative position of said means.

7. THE PALLET ASSEMBLING MACHINE, according to claim 2, wherein the feeding and dosage means for longitudinal and transversal beams are equipped with corresponding spindle screws and sliding guides that regulate the relative position of said means.

8. THE PALLET ASSEMBLING MACHINE, according to claim 1, wherein the feeding and dosage deposit of transversal beams is done by means of two vertical pillars configured in a “U” shape having unequal larger and smaller branches that face each other and are separated by an appropriate distance which is the length of transversal beams, said pillars configure a vertical guide to store the transversal beams, that lean on one of their longitudinal edges on the larger branch of said pillars; basculating bumpers being provided to contain the lower transversal beam that when said basculating bumpers act permit the fall of said beam towards the second channel after each transversal beam has been oriented to a vertical position by means of a tilted surface whose function is to act as deflector; at the exit of said deflector and above the second channel there is a pusher that presses the transversal beam to a vertical and downward direction to fall against the appropriate longitudinal beam previously placed in the area.

9. THE PALLET ASSEMBLING MACHINE, according to claim 8, wherein the feeding and dosage means for longitudinal and transversal beams are equipped with corresponding spindle screws and sliding guides that regulate the relative position of said means.

10. PALLET ASSEMBLING MACHINE, according to claim 1, wherein the transportation rail guides to move the longitudinal beams have retractile bumper elements located on their sides, said retractile bumper elements are placed in the areas where the transversal beams will be assembled; permitting the downward sliding movement of these transversal beams on their way to be assembled on the longitudinal beams.

11. THE PALLET ASSEMBLING MACHINE, according to claim 10, wherein the feeding and dosage means for longitudinal and transversal beams are equipped with corresponding spindle screws and sliding guides that regulate the relative position of said means.

12. THE PALLET ASSEMBLING MACHINE, according to claim 1, wherein the feeding and dosage means for longitudinal and transversal beams are equipped with corresponding spindle screws and sliding guides that regulate the relative position of said means.

* * * * *